US012711428B2

(12) United States Patent
Litany et al.

(10) Patent No.: US 12,711,428 B2
(45) Date of Patent: Aug. 18, 2026

(54) ARCHITECTURE-AGNOSTIC FEDERATED LEARNING SYSTEM

(71) Applicant: NVIDIA Corporation, Santa Clara, CA (US)

(72) Inventors: Or Litany, Sunnyvale, CA (US); Haggai Maron, Rehovot (IL); David Jesus Acuna Marrero, Toronto (CA); Jan Kautz, Lexington, MA (US); Sanja Fidler, Toronto (CA); Gal Chechik, Ramat Hasharon (IL)

(73) Assignee: NVIDIA Corporation, Santa Clara, CA (US)

( * ) Notice: Subject to any disclaimer, the term of this patent is extended or adjusted under 35 U.S.C. 154(b) by 1119 days.

(21) Appl. No.: 17/827,446

(22) Filed: May 27, 2022

(65) Prior Publication Data

US 2022/0391781 A1 Dec. 8, 2022

Related U.S. Application Data

(60) Provisional application No. 63/194,149, filed on May 27, 2021.

(51) Int. Cl.
*G06N 20/20* (2019.01)
*G06F 18/2132* (2023.01)
*G06N 7/01* (2023.01)

(52) U.S. Cl.
CPC ....... *G06N 20/20* (2019.01); *G06F 18/21322* (2023.01); *G06N 7/01* (2023.01); *G06F 18/21326* (2023.01)

(58) Field of Classification Search
CPC .......... G06N 20/20; G06N 7/01; G06N 3/098; G06N 3/044; G06N 3/045; G06N 3/0464; G06F 18/21322; G06F 18/21326
See application file for complete search history.

(56) References Cited

U.S. PATENT DOCUMENTS

2023/0385652 A1* 11/2023 Zhu ........................ G06N 20/00

OTHER PUBLICATIONS

Zhang, Chris, Mengye Ren, and Raquel Urtasun. "Graph hypernetworks for neural architecture search." arXiv preprint arXiv: 1810.05749 (2018). https://arxiv.org/pdf/1810.05749 (Year: 2018).*
Ha, David, Andrew Dai, and Quoc V. Le. "Hypernetworks." arXiv preprint arXiv:1609.09106 (2016). https://arxiv.org/pdf/1609.09106 (Year: 2016).*
Yu, Fuxun, et al. "Heterogeneous federated learning." arXiv preprint arXiv:2008.06767 (2020). https://arxiv.org/pdf/2008.06767v1 (Year: 2020).*

(Continued)

*Primary Examiner* — Michael H Hoang
(74) *Attorney, Agent, or Firm* — Leydig, Voit & Mayer, Ltd.

(57) ABSTRACT

A method performed by a server is provided. The method comprises sending copies of a set of parameters of a hyper network (HN) to at least one client device, receiving from each client device in the at least one client device, a corresponding set of updated parameters of the HN, and determining a next set of parameters of the HN based on the corresponding sets of updated parameters received from the at least one client device. Each client device generates the corresponding set of updated parameters based on a local model architecture of the client device.

25 Claims, 11 Drawing Sheets

(56) References Cited

OTHER PUBLICATIONS

Diao, Enmao, Jie Ding, and Vahid Tarokh. "Heterofl: Computation and communication efficient federated learning for heterogeneous clients." arXiv preprint arXiv:2010.01264 (2020). https://arxiv.org/pdf/2010.01264v2 (Year: 2020).*

Shamsian A, Navon A, Fetaya E, Chechik G. Personalized Federated Learning using Hypernetworks. arXiv preprint arXiv: 2103.04628. Mar. 8, 2021. https://arxiv.org/abs/2103.04628 (Year: 2021).*

* cited by examiner

ARCHITECTURE-AGNOSTIC FEDERATED LEARNING SYSTEM

CROSS-REFERENCE TO RELATED APPLICATIONS

This application claims the benefit of U.S. Provisional Application No. 63/194,149 titled "ARCHITECTURE-AGNOSTIC FEDERATED LEARNING SYSTEM," filed May 27, 2021, the entire contents of which is incorporated herein by reference

BACKGROUND

Federated learning (FL) is an approach that allows multiple clients (such as edge devices) to collaboratively train a strong model without sharing their data. Instead of sharing data, a central hub aggregates parameters of one or more local models. FL yields better privacy, reduces the volume of data transferred, and allows for safe and efficient learning to be performed at edge nodes like smartphones, self-driving cars, and medical systems.

However, current techniques are limited in that all local models must share the same architecture (deep network structure), so that the parameters of each of the local models can be aggregated. In real cases, service providers can run different networks on edge devices, due to different OS versions or computational limitations. Moreover, service providers may want to keep their model architectures private. In other cases, competing companies may want to benefit from each other's access to data without having to share their proprietary architectures.

As the foregoing illustrates, there is a need to develop a technology that supports federated learning between clients with different architectures that implement different local model architectures.

SUMMARY

A method, system and computer-readable medium are disclosed herein to support architecture-agnostic federated learning.

In an exemplary embodiment, the present disclosure provides a method performed by a server. The method comprises sending a copy of a set of parameters of a hyper network (HN) to at least one client device, receiving a corresponding set of updated parameters of the HN from at least one client device, and determining a next set of parameters of the HN based on the corresponding sets of updated parameters received from at least one client device. Each client device in the at least one client device generates a corresponding set of updated parameters based on a local model architecture of that client device.

In a further exemplary embodiment, the local model architecture of each client device in the at least one client device is represented by a descriptor, and the descriptor is processed by the HN to output a set of weights conditioned to the local model architecture of the client device.

In a further exemplary embodiment, the client device generates the corresponding set of updated parameters using local data and the copy of the set of parameters of the HN sent to the client device.

In a further exemplary embodiment, the client device determines optimized weights of the local model architecture by performing a local optimization process on the local model architecture using the local data. The client device determines the set of weights conditioned to the local model architecture of the client device by processing the descriptor using the HN and the copy of the set of parameters of the HN. The client device determines the corresponding set of updated parameters based on differences between the optimized weights of the local model architecture and the set of weights conditioned to the client device.

In a further exemplary embodiment, the client device performs a predefined number of iterations for the local optimization process to generate the optimized weights of the local model architecture. The local optimization process is performed to refine the parameters generated by the HN.

In a further exemplary embodiment, the HN comprises a first sub-network and a second sub-network, and the HN processes the descriptor of the local model architecture by the first sub-network in a first stage and processes the output of the first stage by the second sub-network in a second stage.

In a further exemplary embodiment, the first sub-network is a neural network associated with a first subset of parameters among the set of parameters of the HN, and the second sub-network is a set of multilayer perceptrons (MLPs) associated with a second subset of parameters among the set of parameters of the HN.

In a further exemplary embodiment, the HN comprises a graph hyper network (GHN) and the descriptor associated with each client device in the at least one client device comprises a graph that includes a plurality of nodes and at least one directed edge.

In a further exemplary embodiment, determining the next set of parameters of the HN further comprises averaging the corresponding sets of updated parameters of the HN from at least one client device. The server performs per-element averaging among the corresponding sets of updated parameters of the HN.

In a further exemplary embodiment, the method further comprises sending the next set of parameters of the HN to the at least one client device for a next round of communication.

In another exemplary embodiment, the present disclosure provides a method performed by a client device. The method comprises receiving a copy of a set of parameters of a hyper network (HN) from a server, determining a corresponding set of updated parameters of the HN based on a local model architecture of the client device, and sending the corresponding set of updated parameters of HN to the server. The server determines a next set of parameters of the HN based on corresponding sets of updated parameters received from at least one client device including the client device.

In a further exemplary embodiment, the local model architecture of the client device is represented by a descriptor, and the descriptor is processed by the HN to output a set of weights conditioned to the local model architecture of the client device.

In a further exemplary embodiment, determining the corresponding set of updated parameters of the HN based on a local model architecture of the client device further comprises generating the corresponding set of updated parameters using local data and the copy of the set of parameters of the HN received from the server.

In a further exemplary embodiment, generating the corresponding set of updated parameters using local data and the copy of the set of parameters of the HN received from the server further comprises determining optimized weights of the local model architecture by performing a local optimization process on the local model architecture using the local data, determining the set of weights conditioned to the local model architecture of the client device by processing the descriptor using the HN and the copy of the set of parameters of the HN, and determining the corresponding set of updated parameters based on differences between the optimized weights of the local model architecture and the set of weights conditioned to the client device.

In a further exemplary embodiment, the client device performs a predefined number of iterations for the local optimization process to generate the optimized weights of the local model architecture. The local optimization process is performed to refine the parameters generated by the HN.

In a further exemplary embodiment, the HN comprises a first sub-network and a second sub-network, and the HN processes the descriptor of the local model architecture by the first sub-network in a first stage and processes the output of the first stage by the second sub-network in a second stage.

In a further exemplary embodiment, the first sub-network is a neural network associated with a first subset of parameters among the set of parameters of the HN, and the second sub-network is a set of multilayer perceptrons (MLPs) associated with a second subset of parameters among the set of parameters of the HN.

In a further exemplary embodiment, the server performs per-element averaging among the corresponding sets of updated parameters of the HN from the at least one client device including the client device and obtains the next set of parameters of the HN. The method further comprises receiving the next set of parameters of the HN for a next round of communication.

In yet another exemplary embodiment, the present disclosure provides a system. The system comprises a server and at least one client device. The server is configured to facilitate sending a copy of a set of parameters of a hyper network (HN) to each client device in the at least one client device, receiving a corresponding set of updated parameters of the HN from each client device in the at least one client device, and determining a next set of parameters of the HN based on the corresponding sets of updated parameters received from the at least one client device. Each client device of the at least one client device is configured to facilitate receiving the copy of the set of parameters of the HN from the server, determining the corresponding set of updated parameters of the HN based on a local model architecture of the client device, and sending the corresponding set of updated parameters of HN to the server.

In a further exemplary embodiment, each client device of the at least one client device is further configured to facilitate determining optimized weights of the local model architecture by performing a local optimization process on the local model architecture using the local data, determining a set of weights conditioned to the local model architecture of the client device by processing a descriptor representing the local model architecture of the client device using the HN and the copy of the set of parameters of the HN, and determining the corresponding set of updated parameters based on differences between the optimized weights of the local model architecture and the set of weights conditioned to the client device. The server is further configured to facilitate sending, to the at least one client device, the next set of parameters of the HN for a next round of communication. Each of the at least one client device is further configured to facilitate receiving, from the server, the next set of parameters of the HN.

BRIEF DESCRIPTION OF THE DRAWINGS

The present systems and methods for architecture-agnostic federated learning are described in detail below with reference to the attached drawing figures, wherein.

DETAILED DESCRIPTION

Figure 1A:
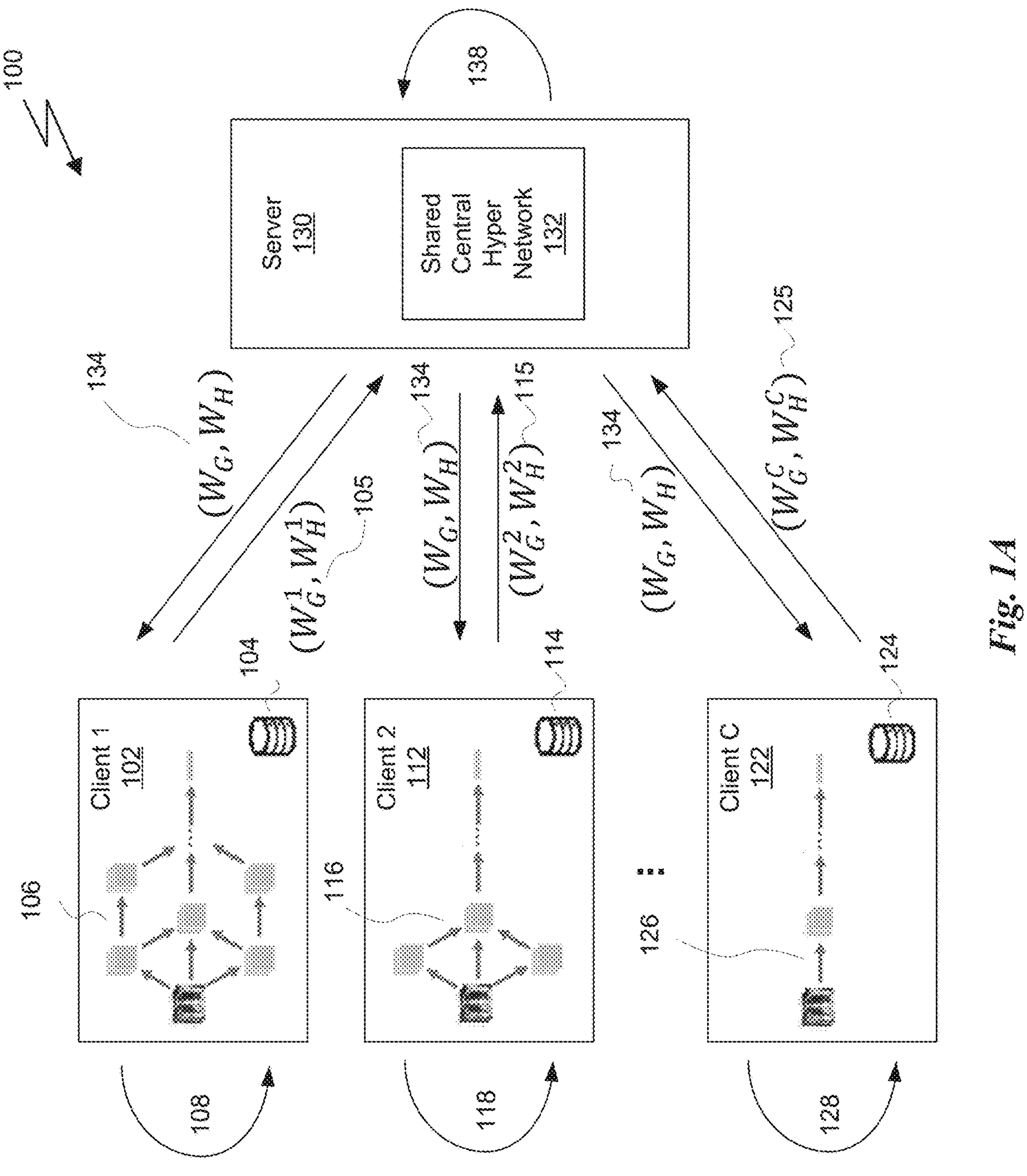
FIG. 1A illustrates an exemplary architecture-agnostic federated learning system, in accordance with some embodiments.

Systems and methods are disclosed related to architecture-agnostic federated learning. An architecture-agnostic federated learning system utilizes a shared central hyper network (HN) to enable architecture-agnostic federated learning. The architecture-agnostic federated learning system may include client devices (e.g., edge devices, terminal devices, clients, etc.) with different model (or network) architectures, and a server that implements the shared central hyper network (HN). The model architectures of the clients may be re-parameterized by using the shared central hyper network. First, the model architecture of each client may be represented by a descriptor (or a representation). Second, the shared central hyper network may process the descriptor corresponding to each client to determine re-parameterized weights for the client. In other words, the re-parameterized weights may be a set of parameters conditioned to the client's local model architecture. At each communication round, the server provides a current set of parameters of the hyper network to the clients. The clients determine updates to the parameters of the local copy of the hyper network based on a local dataset. Upon receiving the sets of updated parameters of the hyper network from the clients, the server performs aggregation (e.g., averaging) and refreshes the current set of parameters of the hyper network. In some embodiments, the systems and methods disclosed herein may be implemented in federated learning as well as personalized federated learning (pFL) as a variant of federated learning. Federated learning usually aims to train a global model across multiple clients based on the decentralized local dataset thereon. A federated learning setting may include one or more clients using the same or different model architectures. On the other hand, pFL aims to personalize the global model for each client in the federation. For example, pFL may train one or more machine learning models for multiple clients in the federation, each client with its own data distribution. In a pFL setting, the descriptor/representation of each client may be not only related to one of the one or more machine learning models relevant to the client but also client-specific. As such, the hyper network can generate a set of personalized parameters by processing the descriptor/representation of each client. In some embodiments, a single device may have one or more client instances running thereon. The one or more client instances may be associated with the same or different model architectures.

In some embodiments, the server provides copies of a set of parameters of the hyper network to the clients. The clients use the set of parameters of the hyper network to re-parameterize or update the weights of the clients' local model architecture. In some embodiments, the hyper network may include multiple sub-networks. Accordingly, the set of parameters of the hyper network may include multiple subsets of parameters corresponding to the sub-networks. To this end, the hyper network may process the descriptors of the clients in multiple stages using the corresponding subsets of parameters of the hyper network.

In some embodiments, the architecture-agnostic federated learning system implements a graph hyper network (GHN), which takes graphs as input. Accordingly, the descriptor of each client's model architecture may be a graph representation. In some examples, the model architecture of a client may be encoded as a line graph of a standard activation graph, with nodes representing parametric layers and direct edges representing the forward computational path. The GHN may be applied to the line graph representing the client's model architecture so as to produce per-node weight vectors that are populated to the client's local model architecture.

In further embodiments, the GHN may include two sub-networks: (1) a graph neural network (GNN, referred to as G), and (2) a set of multilayer perceptrons (MLPs). The GHN may perform weight prediction in two stages. First, the GNN takes a graph representation of a model architecture as an input and processes the graph representation to generate latent node representations. Second, the set of MLPs are used to map the latent node representations to layer weights.

In some embodiments, the training procedure of the GHN is based on local updates of the GHN weights, which is performed on all clients and followed by a GHN weight aggregation process on the shared server.

Several terms, which are frequently used in the present disclosure, are defined as follows for ease of understanding.

Federated Learning (FL) is a learning framework, in which multiple clients collaboratively train individual models while trying to benefit from the data of all the clients without sharing their data.

Architecture Agnostic Federated Learning (AAFL) is a federated learning framework, in which clients may have different network architectures.

Graph Neural Networks (GNN) are deep models that take graph-structured data as input. These models may be used for many applications such as social network analysis, physical chemistry, molecular biology, and epidemic control. In some embodiments, a graph learning architecture is employed, which implements message passing neural networks. In other words, these models maintain a continuous state (feature) for each node and update it locally using a parametric function (e.g., a fully connected network) and the graph connectivity.

Hyper Networks (HN) are neural networks that predict input conditioned weights for another neural network that performs the task of interest. HNs may be used for many learning tasks such as point cloud reconstructions, neural architecture search, and language modeling. As one type of HN, Graphic Hypernetworks (GHN) take graphs as input and predict weights for other GNN (or graph representations of other neural networks).

FIG. 1A illustrates an exemplary architecture-agnostic federated learning system 100, in accordance with some embodiments. The architecture-agnostic federated learning system 100 may include C number of clients (e.g., 102, 112, and 122). The C number of clients each has a corresponding model architecture and data. For instance, client 1 102 has a local model architecture (or local model) 106 and data 104, client 2 112 has a local model architecture 116 and data 114, and client C 122 has a local model architecture 126 and data 124. As shown in FIG. 1A, the model architectures of the clients may be different. In some variations, the model architectures of the clients may be the same. The architecture-agnostic federated learning system 100 may further include a server 130, which implements a shared central hyper network 132. Each of the clients (e.g., 102, 112, and 122) and the server 130 may include various hardware and/or software components. For example, a client/server may include one or more processors and a memory storing instructions configured to be executed by the processor(s). In an embodiment, the processors can include a host processor (e.g., CPU) and a coprocessor such as a graphics processing unit or parallel processing unit. The parallel processing unit can be configured to implement, at least in part, the local model architecture 116 and/or the hyper network 132. The clients and or server unit may include similar components, features, and/or functionality to the exemplary parallel processing unit 400 of FIG. 4, exemplary processing system 500 of FIG. 5A, exemplary system 565 of FIG. 5B, exemplary system 555 of FIG. 5C, and/or system 605 of FIG. 6. In some examples, each client in the architecture-agnostic federated learning system 100 may run on a separate client device. In some instances, two or more clients (e.g., 102, 112, and 122) in the architecture-agnostic federated learning system 100 may be instances that run on a same device. As an example, a server in a hospital may be embodied as a client device, which may run multiple client instances associated with same or different model architectures.

At each communication round, the server 130 sends copies of a set of parameters 134 of the hyper network 132 to the C number of clients (e.g., 106, 116, and 126) in the system 100. Each of the clients 1, 2, . . . , C performs local updating of a copy of the set of parameters 134 of the hyper network 132 so as to generate a set of updated parameters of the hyper network 132. As shown in FIG. 1A, client 1 102 may perform local update operations 108 with a predefined number of iterations to generate a set of updated parameters 105 of the hyper network 132. Similarly, client 2 may perform local update operations 118 to generate a set of updated parameters 115 of the hyper network 132. Also, client C may perform local update operations 128 to generate a set of updated parameters 125 of the hyper network 132. Upon receiving the sets of updated parameters of the hyper network 132, the server 130 may perform averaging operations 138 and obtain a set of refreshed parameters 134 of the hyper network 132. The architecture-agnostic federated learning system 100 may repeat the aforementioned communication round to realize the federated learning. In some embodiments, the architecture-agnostic federated learning system 100 may include a single client and a server 130. As such, in each communication round, the server 130 may obtain a set of refreshed parameters 134 of the hyper network 132 based on a set of updated parameters from the client.

In some embodiments, the hyper network 132 may include two sub-networks. Accordingly, the set of parameters 134 of the hyper network 132 may include two sets of parameters denoted as $W_G$ and $W_H$, which are related to the two sub-networks included in the hyper network 132. For instance, the hyper network 132 may include a neural network and a set of MLPs (Multi-Layer Perceptrons). The neural network may have a plurality of layers and corresponding layer-specific parameters. $W_G$ may be defined as a concatenation of the layer-specific parameters, which are learnable. The set of MLPs may include a plurality of MLPs, which are related to multiple layer types with different output sizes, and corresponding learnable parameters related to the MLPs. $W_H$ may be defined as a concatenation of the learnable parameters related to the MLPs.

In further embodiments, upon receiving a copy of the set of parameters 134 of the hyper network 132, the client may use the set of parameters 134 of the hyper network 132 to re-parameterize the model weights of the local model architecture as a function of the hyper network 134. The client may train the re-parameterized model of the local model architecture using local data, and eventually predict a set of updated parameters of the hyper network 132. In this way, sets of updated parameters of the hyper network 132, such as the sets 105, 115, and 125, may be generated.

As the foregoing illustrates, the clients in the architecture-agnostic federated learning system 100 may have different model architectures. The shared central hyper network 132 may be utilized to re-parameterize the local model architectures of the clients. As a result, the set of parameters of the shared central hyper network 132 may be used by the clients to predict sets of updated parameters of the shared central hyper network 132 based on the clients' local model architectures and data. As such, the disclosed architecture-agnostic federated learning system may adapt to different local model architectures of clients, whereby allowing meaningful parameters sharing across models. Moreover, the framework of the disclosed architecture-agnostic federated learning system does not rely on external data, nor does it require clients to disclose their model architecture, thereby enabling an inter-organizational collaborative training that preserves both data privacy and architectural proprietary.

Figure 1B:
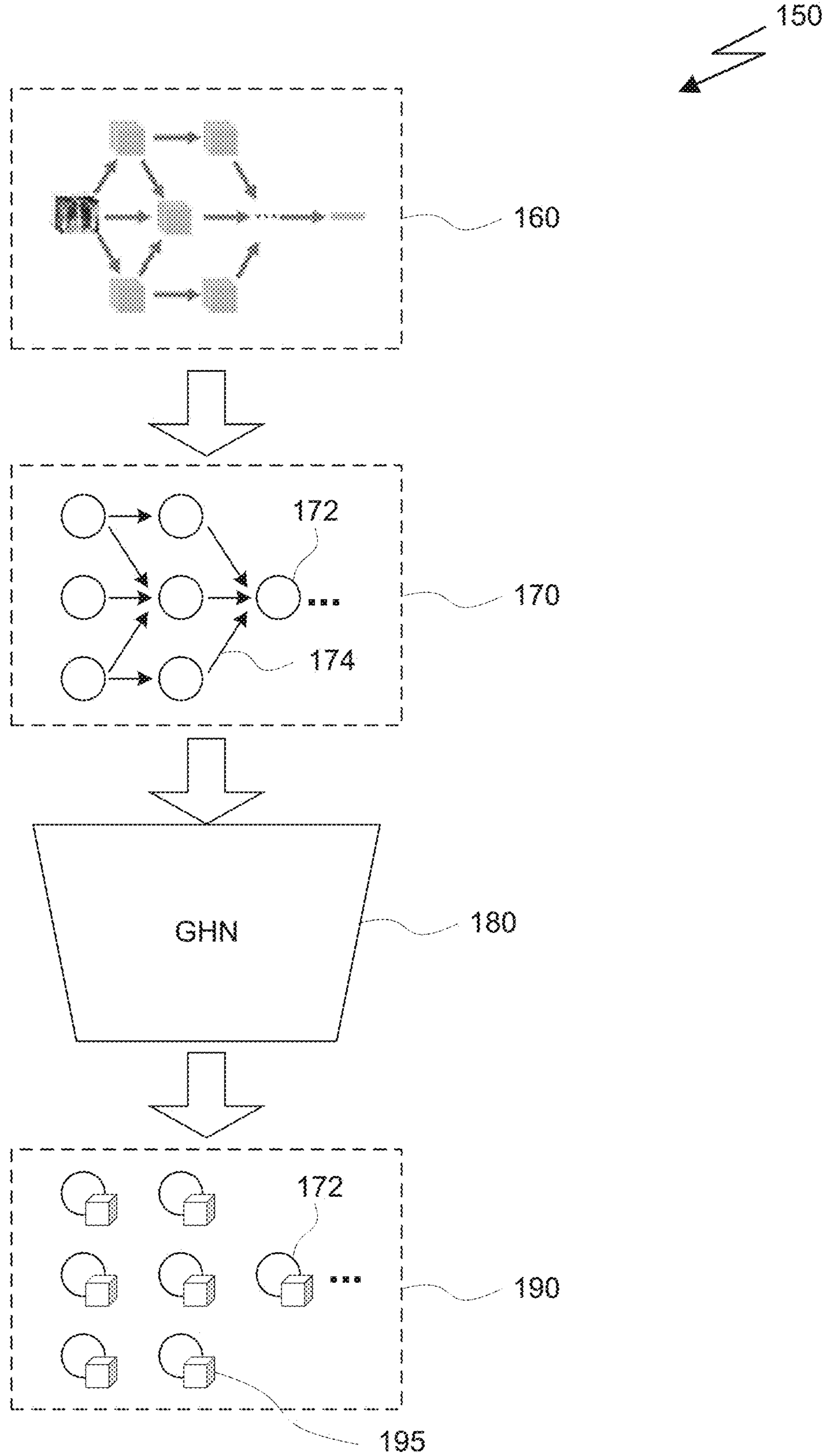
FIG. 1B illustrates an exemplary process of re-parameterizing a client's model architecture, in accordance with some embodiments.

FIG. 1B illustrates an exemplary process 150 of re-parameterizing a client's model architecture 160, in accordance with some embodiments. To illustrate, the exemplary process 150 utilizes a shared graph hyper network 180, which takes graphs as input.

First, a descriptor 170 is determined for the client's model architecture 160. As shown in FIG. 1B, the descriptor may be a line graph that includes nodes 172 and directed edges 174. The model architecture 160 may be encoded as the line graph of a standard activation graph. The nodes 172 of the descriptor 170 may represent parametric layers, while the directed edges 174 of the descriptor 170 may represent forward computational paths.

Second, the graph hyper network 180 may take the descriptor 170 as an input. The graph hyper network 180 may include multiple sub-networks, such as a graph neural network (GNN) and a set of MLPs, which process the descriptor 170 through different stages. In one stage, the graph hyper network 180 may process the descriptor 170 using a T-layer GNN with learnable parameters $W_G$ to determine node features. For instance, the GNN may process the descriptor 170 and output latent node representations. The learnable parameters $W_G$ may include layer-specific parameters of the GNN, which are used to calculate the latent node representations of the nodes in the descriptor 170. In another stage, the graph hyper network 180 may use the set of MLPs with learnable parameters $W_H$ to determine layer weights. The learnable parameters $W_H$ may represent mappings between latent node representations to the layer weights.

Third, the graph hyper network 180 may output per-node weight vectors 195 for the nodes 172, which may be referred to as a set of output parameters 190. In other words, the set of output parameters 190 are determined based on the graph hyper network 180 as well as the client's local model architecture 160.

In an architecture-agnostic federated learning system, such as the system 100 as shown in FIG. 1A, The clients may have different network (or model) architecture $f_c$ with different model weights $\theta_c$. $\theta_c$ may be a parameter vector. Different parameter vectors $\theta_c$ may have different shapes and sizes, therefore, direct aggregation of these parameter vectors $\theta_c$ may be challenging or even impractical. As shown in FIG. 1B, the different model weights $\theta_c$ may be re-parameterized as a function of the hyper network, which may be used as a knowledge aggregate. The hyper network (such as the GHN 180 in FIG. 1B) takes as input a representation of $f_c$, and outputs weights of the local model architecture 160, which are conditioned on the architecture $f_c$. The type of structure, that is the network architecture, may be represented by a variety of ways, such as graph representations, text representation or other types of representations. The following embodiments takes graph representations, as an example, which are processed by graph hyper networks (GHN).

Figure 2:
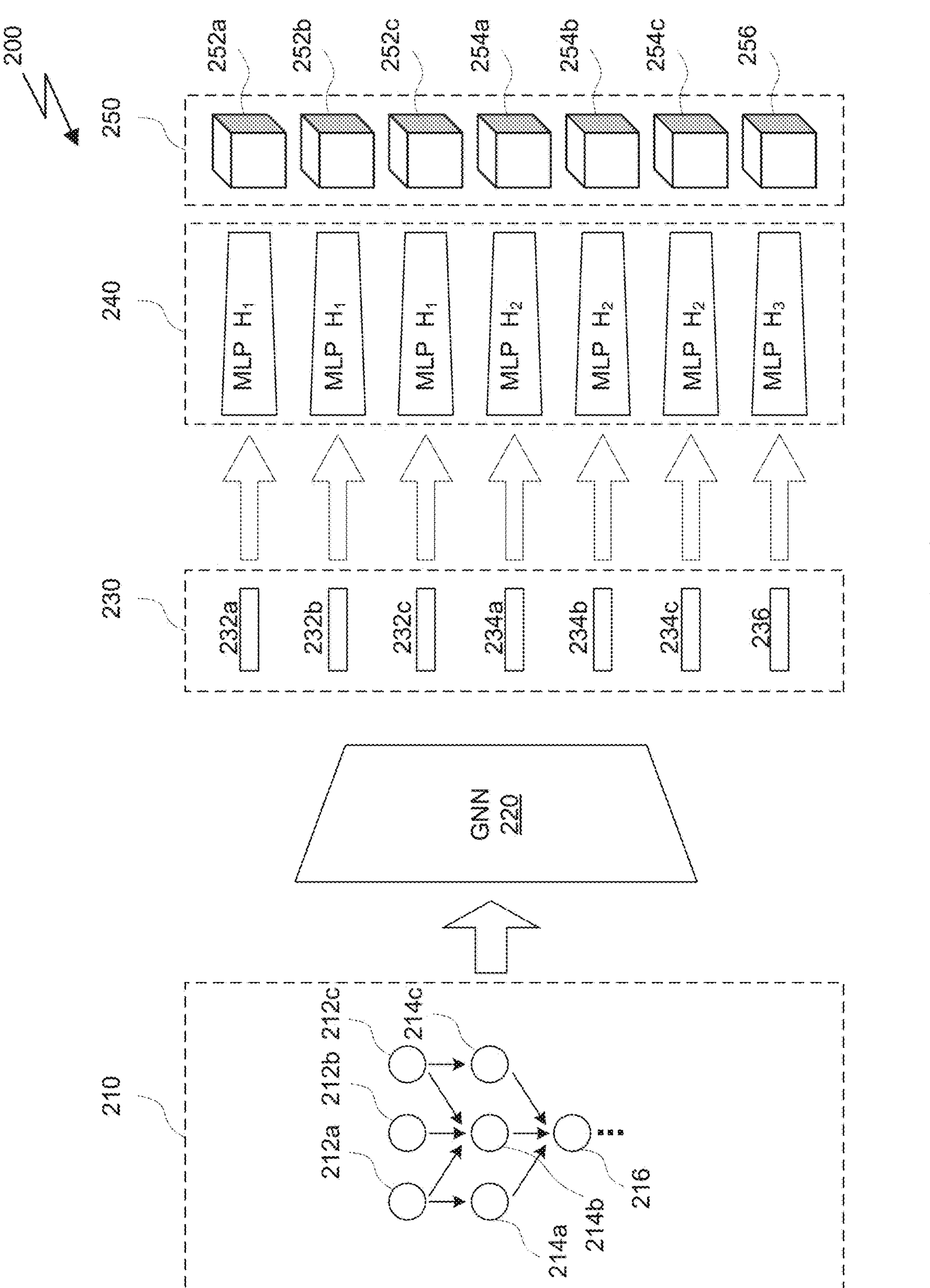
FIG. 2 illustrates an exemplary process of processing a descriptor of a client's local neural (or model) architecture using a graph hyper network, in accordance with some embodiments.

FIG. 2 illustrates an exemplary process 200 for processing a descriptor 210 of a client's local neural (or model) architecture using a graph hyper network, in accordance with some embodiments. The graph hyper network may be implemented in a server, which refreshes a set of parameters of the graph hyper network in each communication round between the server and the clients in the federated learning system. Similar to the descriptor 170 as shown in FIG. 1B, the descriptor 210 may be a line graph that includes nodes and directed edges. The nodes of the descriptor 210 may represent parametric layers, while the directed edges of the descriptor 210 may represent forward computational paths. The descriptor 210 may include multiple layers, and a number of nodes in each layer. For example, three layers in the line graph of the descriptor 210 are depicted in FIG. 2. From top to bottom, nodes 212*a*, 212*b*, and 212*c* are in the first layer, nodes 214*a*, 214*b*, and 214*c* are in the second layer, and node 216 is in the third layer.

In some embodiments, a neural architecture (e.g., a model architecture of a client) may be represented as a graph A=(V, ε, X) in the following way. The set of vertices V contains a vertex (or node) v for each parametric layer in the architecture. The set of edges ε represents the computational flow of the architecture. If the output of the layer represented by v is the input of a layer represented by u, an edge between the nodes (layer) v to layer u may be expressed by, $$e=(v,u)\in\varepsilon. \quad \text{(Eq. 1)}$$

$X\in\mathbb{R}^{|V|\times f}$ is a matrix that holds the input node features. Initially, each node is equipped with categorical features indicating the layer type they represent, denoted by $L=\{l_1, \ldots, l_k\}$. For example, a layer type can represent a 3×3 convolution layer (as shown in the descriptor 210 in FIG. 2) with a specific number of input and output features.

The graph hyper network may include multiple sub-networks, such as a graph neural network (GNN) 220 and a set of MLPs 240. The client receives a copy of a set of parameters of the graph hyper network from the server. The set of parameters of the graph hyper network may include a first subset of parameters related to layer-specific parameters and a second subset of parameters related to mapping of node features. In some embodiments, the first subset of parameters are concatenated to form parameters $W_G$, while the second subset of parameters are concatenated to form parameters $W_H$.

The GNN 220, denoted as $G(\bullet;W_G)$, may have T layers and have a form expressed by the following Equation:

$$h_v^{(t)}=\sigma\left(A^{(t)}h_v^{(t-1)}+B^{(t)}\sum\nolimits_{\{u|(u,v)\in\varepsilon\}}h_u^{(t-1)}+b^{(t)}\right), \quad \text{(Eq. 2)}$$

where $A^{(t)}$, $B^{(t)}$, and $b^{(t)}$ are layer-specific parameters, and $t\in\{1, \ldots, T\}$ represents the depth of the layer. As mentioned above, $W_G$ may be a concatenation of the parameters $A^{(t)}$, $B^{(t)}$, and $b^{(t)}$, for $t\in\{1, \ldots, T\}$. The process of applying the T-layer GNN with the learnable parameter $W_G$ to the graph representation A (e.g., the descriptor 210) yields latent representations for node $$\{h_v^T; v\in V\},$$

which are referred to as node features. As an example depicted in FIG. 2, an output 230 of the GNN 220 includes node features for the respective node in the descriptor 210. For instance, node feature 232*a* corresponds to the node 212*a*, node feature 232*b* corresponds to the node 212*b*, etc. In this example, node features 232*a-c* are associated with a first layer type, node features 234*a-c* are associated with a second layer type, and node feature 236 is associated with a third layer type. The first, second, and third layer types may be the same or different.

The set of MLPs 240, denoted as $$\{H_l(\cdot; W_H^l)\}_{l\in L},$$

may be used to process the node features from the output 230 of the GNN 220. Each $H_l$ is for a layer type, and $$W_H^l$$

are learnable parameters. The set of MLPs 240 are used to map latent node representations (e.g., as shown in the output 230) to layer weights according to the following expression:

$$W_v=H_{l(v)}(h_v; W_H^{l(v)}),\ v\in V, \quad \text{(Eq. 3)}$$

where, l(v) is the type of the layer represented by the node v. As mentioned above, $W_H$ may be a concatenation of the parameters $$\{W_H^l\}_{l\in L}.$$

As shown in FIG. 2, the set of MLPs 240 are applied to the node features according to the layer types. An output 250 of the set of MLPs 240 include layer weights for the nodes in the descriptor 210. For example, layer weight 252*a* corresponds to the node 212*a*, layer weight 252*b* corresponds to the node 212*b*, etc.

By performing the processes mentioned-above, a client's weight vector $\theta_c(A_c;W_G,W_H)$ for a particular client $c\in\{1, \ldots, C\}$ may be formed.

Training of the graph hyper network is performed on the clients using their local data. For instance, each client $c\in\{1, \ldots, C\}$ has access only to its local data samples $$\{(x_{cj}, y_{cj})\}_{j=1}^{n_c},$$

$n_c$ is the number of data samples on the client c. Each client c may have a local network architecture $f_c(\theta_c)$. Note $f_c(\bullet;\theta_c)$ can be any parametric model with parameters $\theta_c\in\mathbb{R}^{m_c}$ (e.g., a neural network). At each client c, the local optimization tries to solve the following minimization problem:

$$(W_G^c, W_H^c)=\operatorname{argmin}_{(W_G,W_H)}\sum\nolimits_{c=1}^{n_c}\ell(f_c(x_{cj};\theta_c(A_c;W_G,W_H)),y_{cj}). \quad \text{(Eq. 4)}$$

The client c may perform a predefined number of iterations for the local optimization process, which may be a refinement of the parameters generated by the HN. It will be appreciated that similar gradient-based optimization methods may be utilized for the local optimizations. The training of the graph hyper network is followed by a graph hyper network averaging process on the shared server that implements the (shared) graph hyper network.

Overall, the entire federated learning system disclosed herein is to solve the following minimization problem:

$$(\theta_1^*, \ldots, \theta_C^*)=\operatorname{argmin}_{(\theta_1,\ldots \theta_C)}\sum\nolimits_{c=1}^{C}\sum\nolimits_{j=1}^{n_c}\ell(f_c(x_{cj};\theta_c),y_{cj}), \quad \text{(Eq. 5)}$$

for a suitable loss function $\ell:\mathbb{R}^2\rightarrow\mathbb{R}$. It will be appreciated that Equation 5 is not limited to a single output, the Equation 5 can be generalized to vector outputs.

Table 1 illustrates an exemplary algorithm being applied in the federated learning (FL) with a shared central graph hyper network (GHN), in accordance with some embodiments. Table 1 includes exemplary codes to realize the federated learning processes disclosed in the present disclosure (e.g., the above-mentioned processes illustrated in FIGS. 1A, 1B, and 2, or processes 300 and 320 of FIGS. 3A and 3B that are disclosed hereinafter).

TABLE 1

| Algorithm applied in FL with GHN |
|---|
| Input: R: number of communication rounds, C: number of clients |
| create C copies of randomly initialized GHN with parameters $\phi$; |
| for r = 1, . . . , R do |
| Server shares current GHN weights ($W_G$, $W_H$) with all clients c ∈ {1, . . . , C}; |
| for c = 1, . . . C do |
| Update GHN weights by local optimization on client c (see Equation 4); |
| Send updated GHN weights ($W_G^c$, $W_H^c$) to the server; |
| end |
| Average *GHN* weights: $W_G \leftarrow \frac{1}{C}\Sigma W_G^c,\ W_H \leftarrow \frac{1}{C}\Sigma W_H^c$; |
| end |

As illustrated in Table 1, a known number of parameters (e.g., the GHN weights) are exchanged between the server and the clients. The training procedure of the GHN is based on local updates of the GHN weights, which are performed on all clients. In some embodiments, each client obtains a randomly initialized GHN and applies the received copy of the GHN weights to the randomly initialized GHN so as to process a descriptor of the client's local model architecture and obtain output weights that are conditioned to the client's model architecture. Also, the client performs a predefined number of iterations for local optimization on the client's model architecture based on local data so as to optimize weights of the client's model architecture. Then, the client obtains a set of updated GHN parameters (e.g., weights) based on the difference between the optimized weights of the local model architecture and the output weights of the GHN that are conditioned to the client's model architecture, for example, by applying Equation 4. Other gradient based optimization methods may be implemented. Subsequently, a GHN weight averaging process is performed on the shared server. In some embodiments, the shared server performs a per-element averaging process among the updated GHN weights from the clients in the federated learning system. In some embodiments, other aggregation techniques may be used to process the updated GHN weights from multiple clients. By performing the R number of communication rounds, the federated learning system may be optimized by solving the minimization problem as expressed by Equation 5.

Figure 3A:
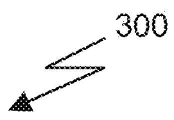
FIG. 3A illustrates a flow chart of a method performed by a server in the federated learning system, in accordance with some embodiments.
Figure 3A:
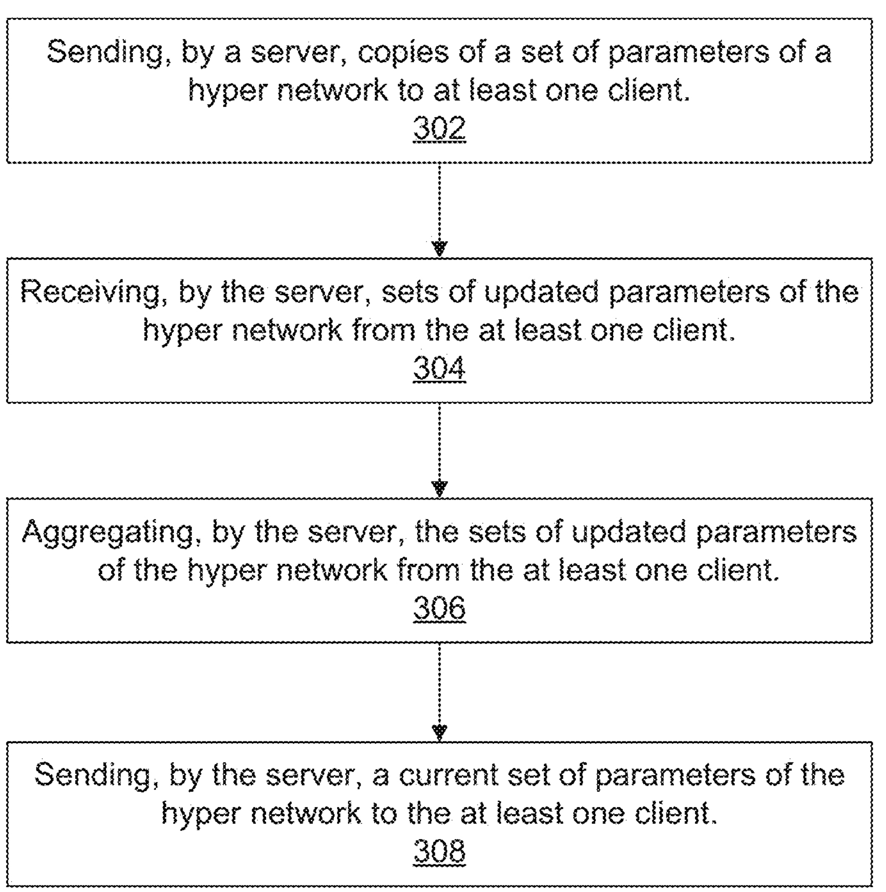
Figure 3B:
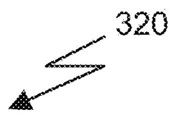
FIG. 3B illustrates a flowchart of a method performed by clients in the federated learning system, in accordance with some embodiments.
Figure 3B:
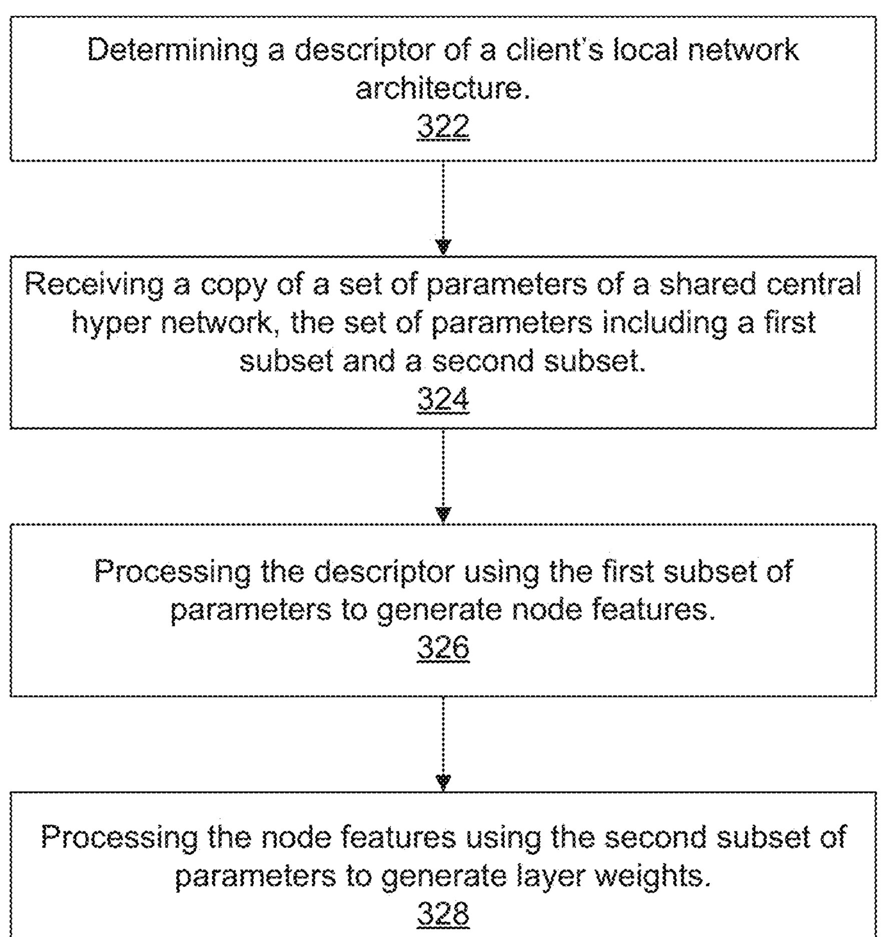
Figure 3C:
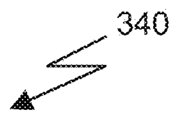
FIG. 3C illustrates a flowchart of a method performed by clients in the federated learning system, in accordance with some embodiments.
Figure 3C:
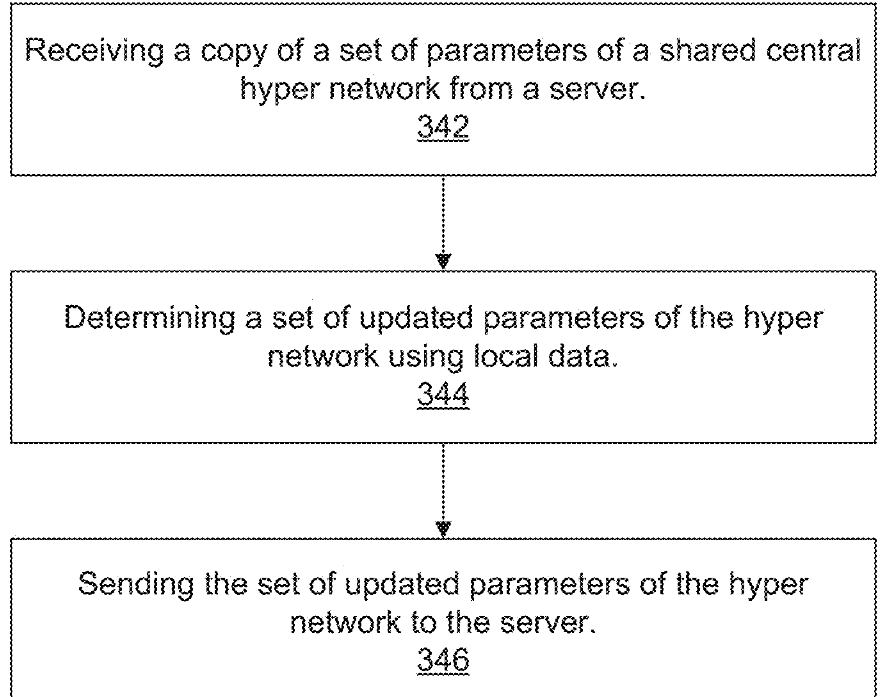

FIGS. 3A, 3B, and 3C illustrate processes performed by client(s) and server(s) in a federated learning system, in accordance with some embodiments. The federated learning system may include at least one client and a server. The server may implement a shared central hyper network. The federated learning system may be an architecture-agnostic federated learning system 100 as illustrated in FIG. 1A. It should be noted that the processes illustrated in FIGS. 3A, 3B, and 3C may be applied to a pFL setting as well.

FIG. 3A illustrates a flowchart of a method 300 performed by a server in the federated learning system, in accordance with some embodiments. The server may implement a shared central hyper network as depicted in FIG. 1A, 1B or 2. The method 300 illustrates an example of executing a communication round by the server.

At step 302, the server sends copies of a set of parameters of the shared central hyper network to at least one client. The set of parameters of the shared central hyper network may include a first subset of parameters and a second subset of parameters. The first subset of parameters may be layer-specific parameters, which are associated with a neural network included in the shared central hyper network. The second subset of parameters may be related to layer types, which are associated with a set of MLPs included in the shared central hyper network.

At step 304, the server receives set(s) of updated parameters of the hyper network from the at least one client. The training procedure of the shared central hyper network is based on local updates of the hyper network weights, which are performed by the at least one client. The at least one client uses local data to train the hyper network and predict the updated weights of the hyper network. Then, the at least one client sends the set(s) of updated parameters of the hyper network to the server.

At step 306, the server performs aggregation on the set(s) of updated parameters of the hyper network from the at least one client. In some embodiments, the aggregation may be facilitated by averaging corresponding sets of updated parameters of the hyper network from the at least one client. The server may perform per-element averaging across the sets of updated parameters of the hyper network from the multiple clients among the at least one client. In other words, the server may calculate an average value for each parameter of the hyper network based on the values of the parameter included in the sets of updated parameters from each of the clients. The server may use the averaging results as the current set of parameters of the shared central hyper network. In some embodiments, the server may determine a current set of parameters of the shared central hyper network based on a set of updated parameters of the hyper network that are generated by one client in the federated learning system.

At step 308, the server sends the current set of parameters of the shared central hyper network to the at least one client.

FIG. 3B illustrates a flowchart of a method 320 performed by client(s) in the federated learning system, in accordance with some embodiments. The federated learning system may include clients with different network architectures. The method 320 illustrates an example of initialization performed by a client. As a result of the method 320, the client may obtain a set of parameters. The client may perform method 320 at an initiation step, for example when the client is connecting to a federated learning system, rebooting or under other situations.

At step 322, a client determines a descriptor of the client's local model architecture. The descriptor may be a graph representation, a text representation or other types of representations.

At step 324, the client receives a set of parameters of a shared central hyper network from a server. As the mentioned above, the shared central hyper network may include multiple sub-networks. The set of parameters may include a first subset of parameters related to a first sub-network and a second subset of parameters related to a second sub-network of the shared central hyper network. In some embodiments, the first sub-network may be a neural network, and the second sub-network may be a set of MLPs.

At step 326, the client processes the descriptor using the first subset of parameters to generate node features. The client applies the first sub-network with the first subset of parameters to the descriptor to generate the node features. In some embodiments, the node features include latent node representations.

At step 328, the client processes the node features using the second subset of parameters to generate layer weights.

The client applies the second sub-network with the second subset of parameters to the node feature to generate per-node weights (e.g., layer weights). The weights are populated to the client's local model architecture. Optionally, the client determines updates to the weights of the local copy of the hyper network based on a local dataset. In this way, the client may facilitate training of the local copy of the hyper network.

FIG. 3C illustrates a flowchart of a method 340 performed by client(s) in the federated learning system, in accordance with some embodiments. The federated learning system may include clients with different network architectures. The method 340 illustrates an example of executing a communication round by a client.

At step 342, the client receives a set of parameters of a shared central hyper network from a server. Step 342 is similar to step 324 of method 320 as illustrated in FIG. 3B.

At step 344, the client determines a set of updated parameters of the hyper network using local data. The client may update the weights of the client's local model architecture as mentioned in step 328 of method 320 in FIG. 1B with the received set of parameters of the hyper network. For example, the client may perform the process 320 as illustrated in FIG. 3B to obtain the weights per node (e.g., the per-node weight vectors 195 as shown in FIG. 1B) for the local model architecture. In some embodiments, the client may randomly initialize a local instance of the hyper network and update the parameters of the local instance of the hyper network based on the copy of parameters from the server. The client may train the local model architecture using the local data by applying a local optimization process with a predefined number of iterations. The local optimization process may refine the weights of the client's local model architecture, which are generated by the hyper network. In this way, the client may optimize the weights of the local model architecture. Then, the client may obtain the set of updated parameters of the hyper network based on the difference between the optimized weights of the local model architecture and the output weights of the GHN that is conditioned to the client's local model architecture. In some examples, the client may determine the set of updated parameters of the hyper network by implementing the local optimization as expressed by Equation 4.

At step 346, the client sends the set of updated parameters of the hyper network to the server. The server may perform averaging on the sets of updated parameters of the hyper network from the clients in the federated learning system, so as to determine a current set of parameters of the central, shared hyper network. In some embodiments, the server may perform per-element averaging across the sets of updated parameters of the hyper network. In some embodiments, the server may determine a current set of parameters of the shared central hyper network based on a set of updated parameters of the hyper network that are generated by one client in the federated learning system.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

For example, the clients and/or server may incorporate one or more processors to perform the methods or implement the techniques discussed above. In an embodiment, at least a portion of the models may be implemented using a parallel processing unit such as PPU 400, described in more detail below.

Parallel Processing Architecture

Figure 4:
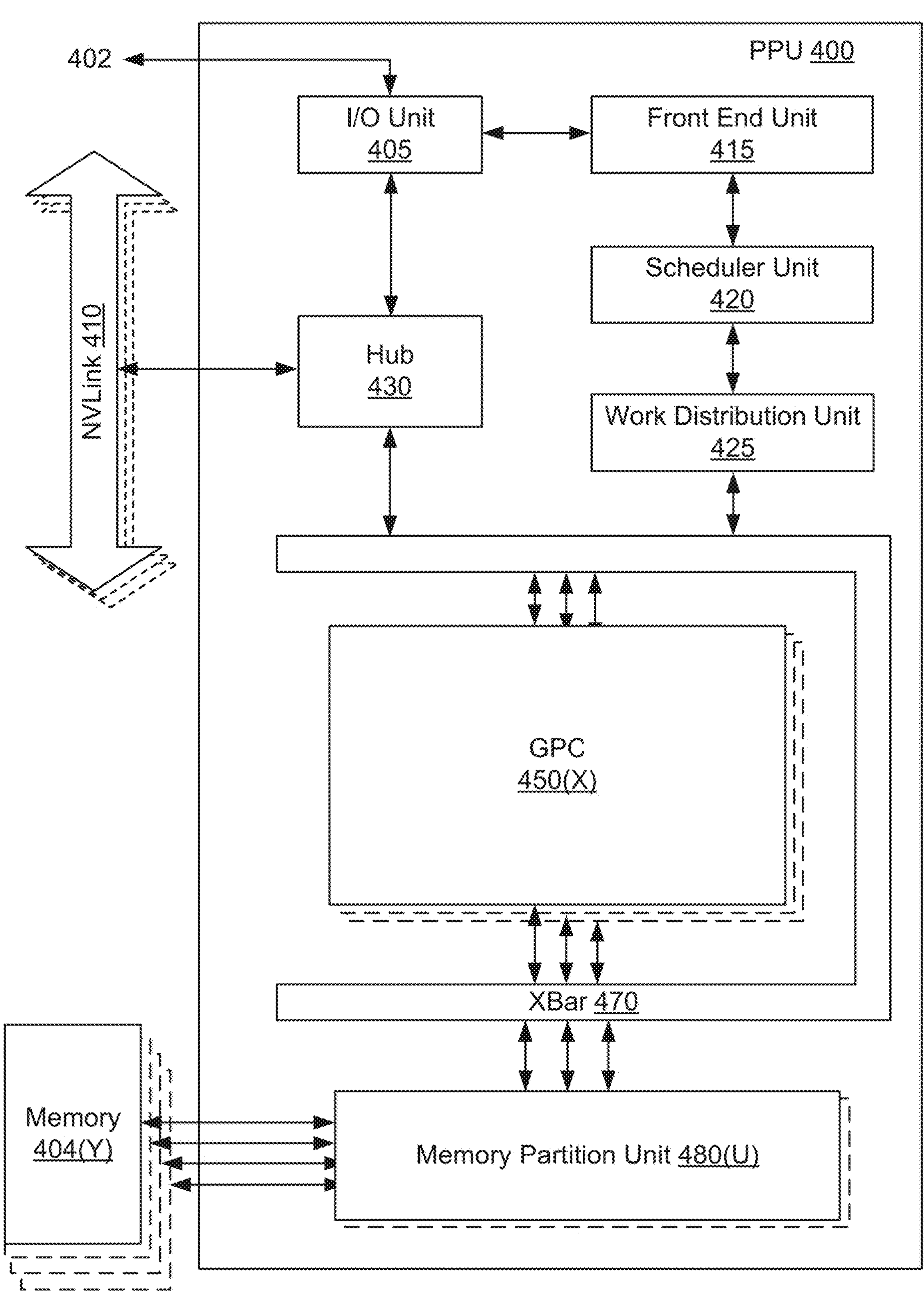
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement any portion of the methods 200, 210, or 220 set forth above. For example, the PPU 400 may be utilized by a ray-tracing algorithm to generate images for display. The ray-tracing algorithm may generate samples for calculating lighting values of a ray, where the samples are generated using one of the techniques set forth above.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units(TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
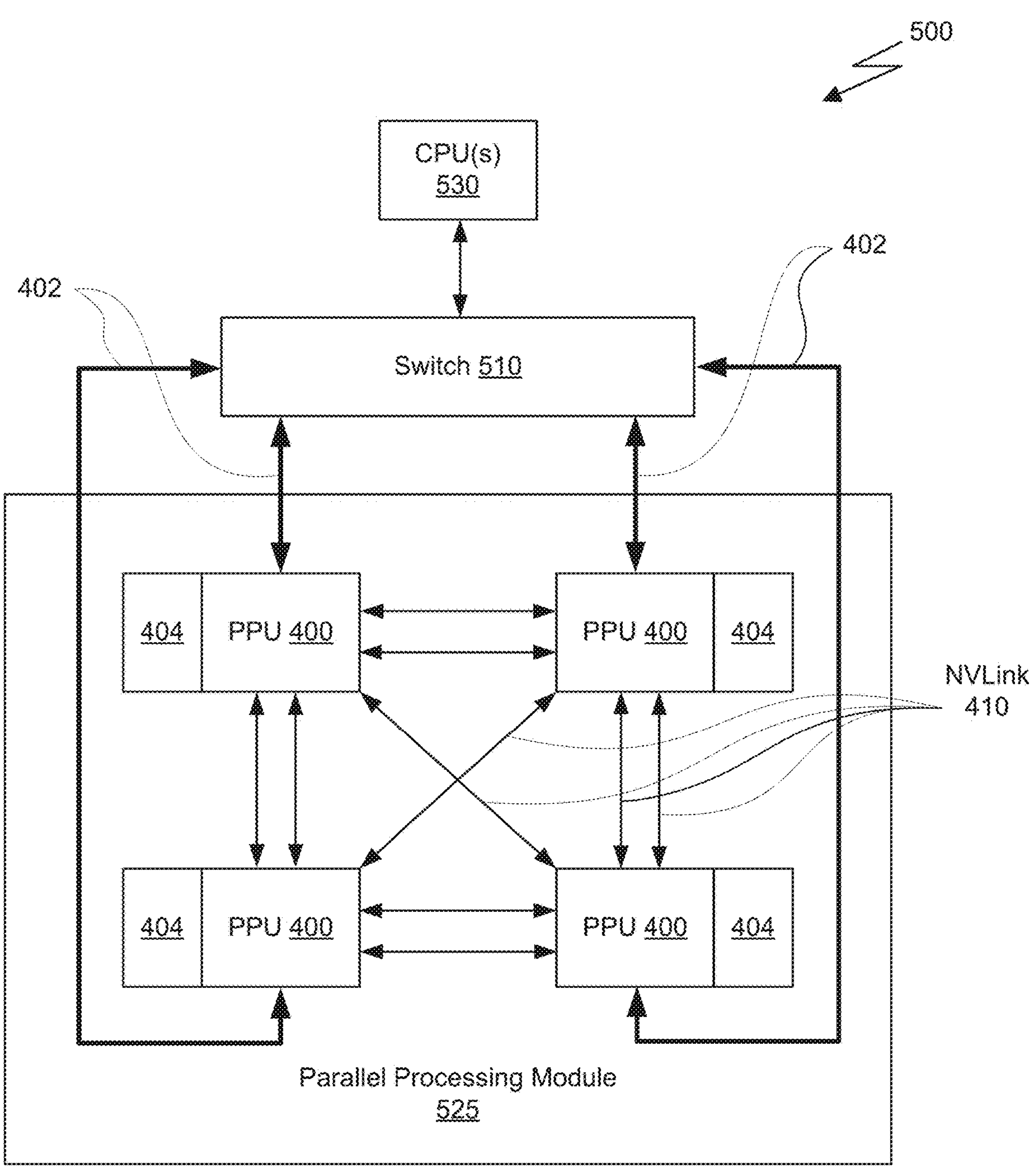
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method(s) shown in FIGS. 2A-2C. The processing system 500 includes a CPU 530, switch 510, and multiple PPUs 400, and respective memories 404.

Figure 5B:
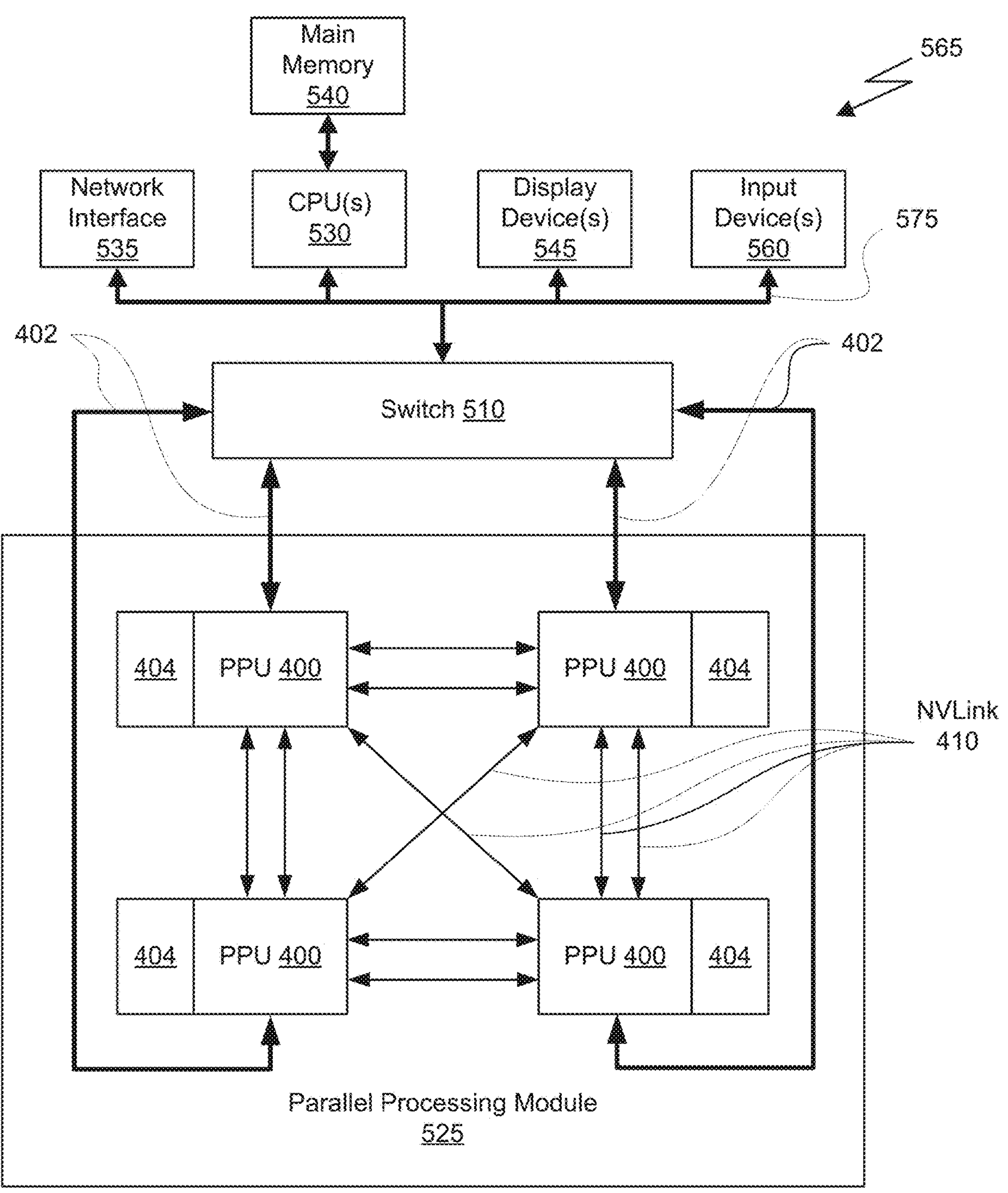
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method(s) shown in FIGS. 2A-2C.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
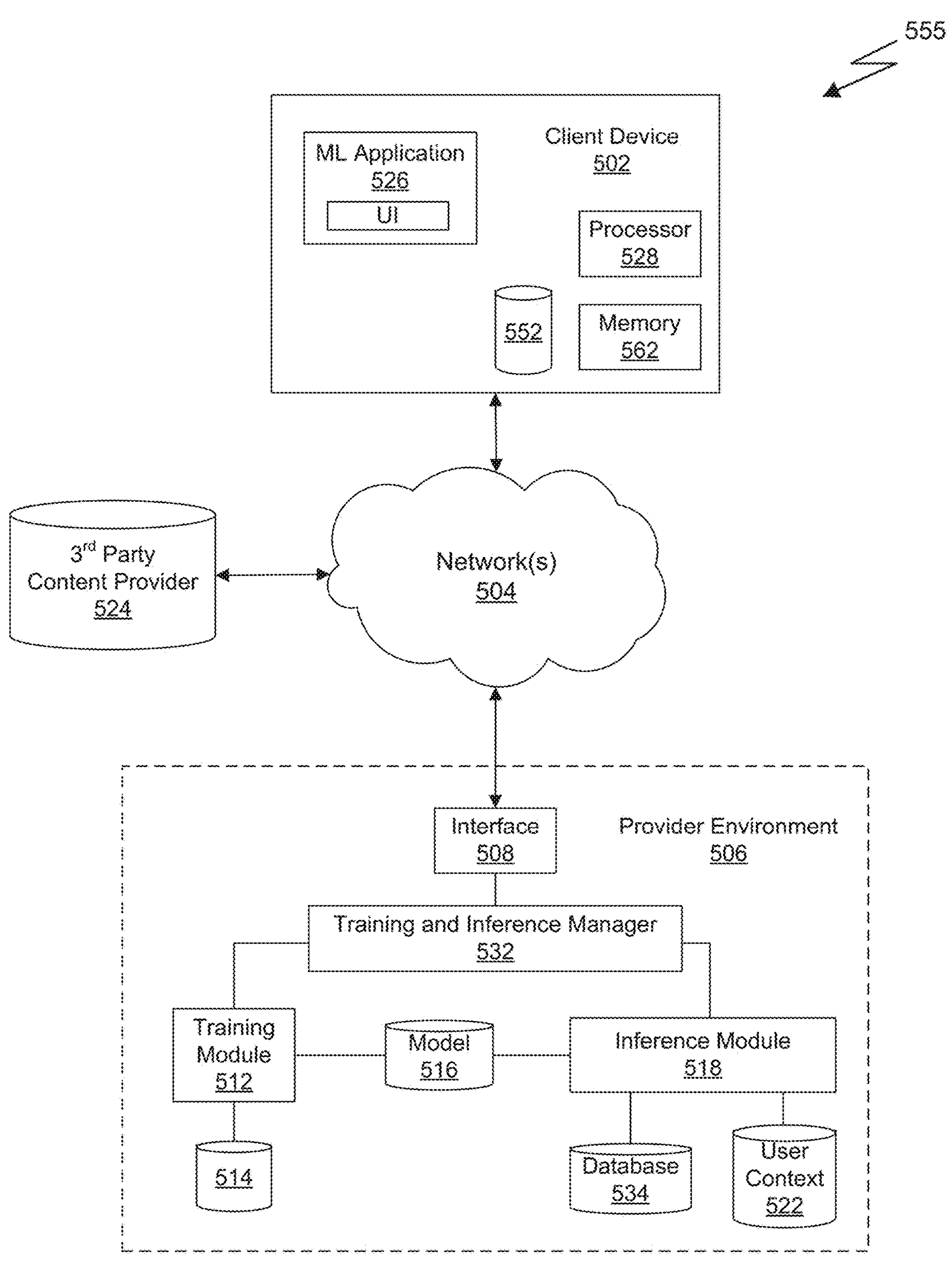
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Example Game Streaming System

Figure 6:
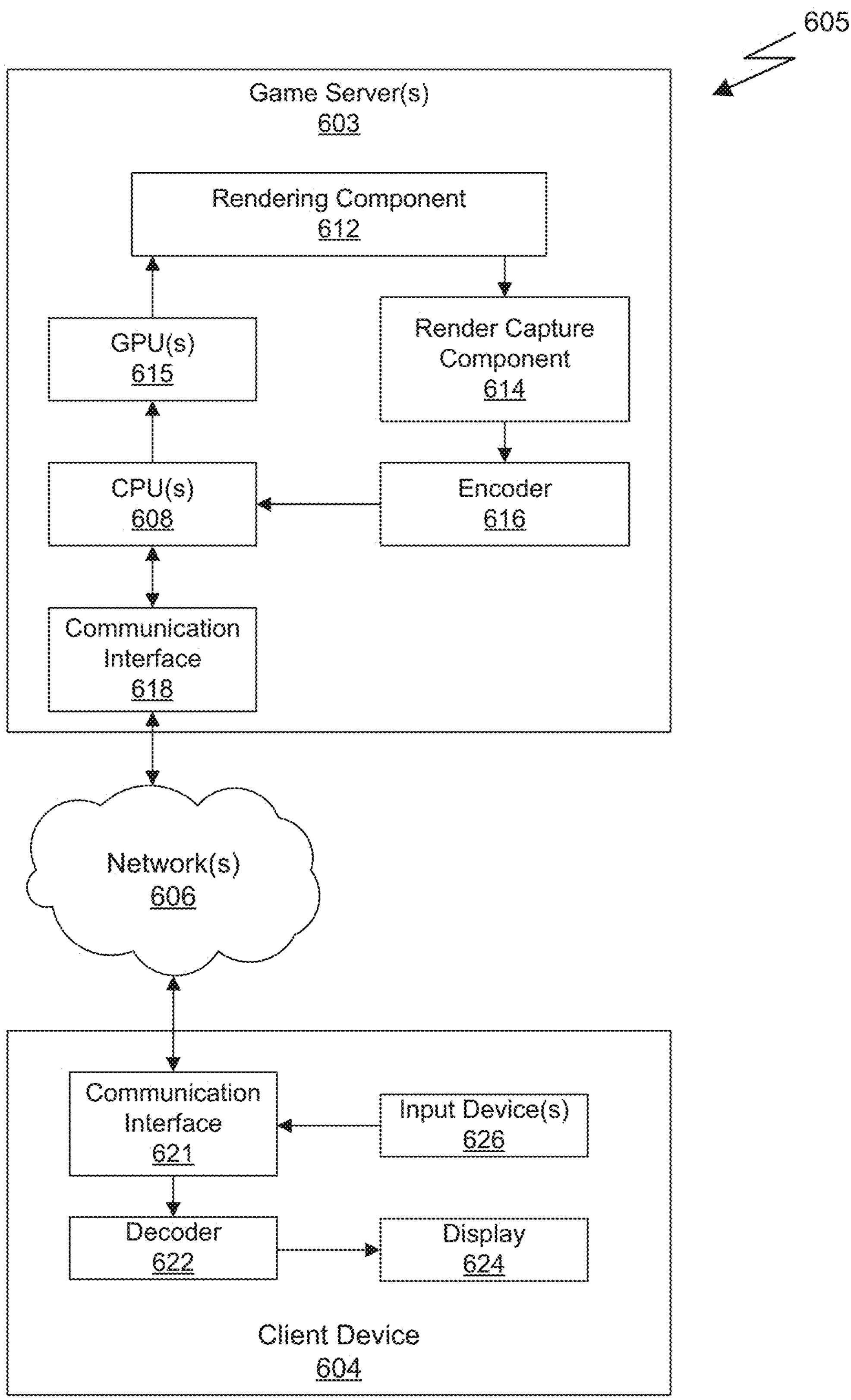
FIG. 6 illustrates an exemplary game streaming system suitable for use in implementing some embodiments of the present disclosure.

FIG. 6 is an example system diagram for a game streaming system 605, in accordance with some embodiments of the present disclosure. FIG. 6 includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for training a hyper network (HN), the method comprising:

sending, by a server to each of a plurality of client devices, a set of parameters of the HN;

receiving, by the server from each of one or more respective client devices of the plurality of client devices, a respective set of locally updated HN parameters; and generating, by the server and based on the one or more respective sets of locally updated HN parameters received from the one or more respective client devices, a globally updated set of parameters of the HN, wherein each of the one or more respective client devices generates a respective set of locally updated HN parameters by training a respective local copy of the HN based on a respective local neural network architecture.

2. The method of claim 1, wherein the server receives a respective set of locally updated HN parameters from every client device of the plurality of client devices to which the server sent the set of parameters of the HN.

3. The method of claim 1, wherein the server receives a first set of locally updated HN parameters from a first client device and a second set of locally updated HN parameters from a second client device.

4. The method of claim 3, wherein the first client device generates the first set of locally updated HN parameters based on a first local neural network architecture of the first client device and using first local training data, and wherein the second client device generates the second set of locally updated HN parameters based on a second neural network architecture of the second client device and using second local training data.

5. The method of claim 1, wherein each respective local neural network architecture is represented by a respective descriptor, and wherein the HN processes the respective descriptor to output a respective set of local neural network architecture weights conditioned to the respective local neural network architecture.

6. The method of claim 5, wherein each of the one or more respective client devices generates the respective set of locally updated HN parameters by:

training the respective local neural network architecture to provide a set of updated local neural network architecture weights, and computing the respective set of locally updated HN parameters based on differences between the set of updated local neural network architecture weights and the respective set of local neural network architecture weights output by the HN.

7. The method of claim 6, wherein each of the one or more of the respective client devices determines the set of updated local neural network architecture weights using respective local data.

8. The method of claim 7, wherein the training the respective local neural network architecture to provide the set of updated local neural network architecture weights comprises performing a predefined number of iterations of a local optimization.

9. The method of claim 5, wherein the HN comprises a first sub-network and a second sub-network, wherein the first sub-network processes the respective descriptor in a first stage, and wherein the second sub-network processes output of the first stage to generate the respective set of local neural network architecture weights in a second stage.

10. The method of claim 9, wherein the first sub-network is a neural network associated with a first subset of parameters among the set of parameters of the HN, and the second sub-network is a set of multilayer perceptrons (MLPs) associated with a second subset of parameters among the set of parameters of the HN.

11. The method of claim 5, wherein the HN is a graph hyper network (GHN) and each respective descriptor by which a respective local neural network architecture is represented comprises a graph that includes a plurality of nodes and at least one directed edge.

12. The method of claim 1, wherein the generating, by the server, the globally updated set of parameters of the HN comprises:

averaging, by the server, the one or more respective sets of locally updated HN parameters received from the one or more respective client devices, wherein the server performs per-element averaging among the one or more respective sets of locally updated HN parameters.

13. The method of claim 1, further comprising:

sending, by the server, the globally updated set of parameters of the HN to the one or more respective client devices of the plurality of client devices for a next round of communication.

14. The method of claim 1, wherein one of the one or more respective client devices has two or more instances running thereon, each respective instance associated with a local neural network architecture of the one client device, and wherein the local neural network architectures associated with the two or more instances are the same or different.

15. The method of claim 9, wherein the HN is a graph hyper network (GHN), wherein each respective descriptor by which a respective local neural network architecture is represented comprises a graph that includes a plurality of nodes and at least one directed edge, wherein the HN processes the respective descriptor to output, in the first stage, a set of node features, each node feature corresponding to a parametric layer in the respective local neural network architecture, and to output, in the second stage, a subset of local neural network architecture weights for each parametric layer.

16. A method for training a hyper network (HN), the method comprising:

receiving, by a client device, a set of parameters of a hyper network (HN) from a server;

generating, by the client device, a set of locally updated HN parameters by training a local copy of the HN based on a local neural network architecture; and sending, by the client device, the set of locally updated HN parameters to the server, wherein the server generates a globally updated set of parameters of the HN based on the set of locally updated HN parameters.

17. The method of claim 16, wherein the local neural network architecture of the client device is represented by a descriptor, and wherein the local copy of the HN processes the descriptor to output a set of local neural network architecture weights conditioned to the respective local neural network architecture.

18. The method of claim 17, wherein the determining, by the client device, the set of locally updated HN parameters based on the local neural network architecture comprises:

generating, by the client device, the set of locally updated HN parameters using local data and the set of parameters of the HN received from the server.

19. The method of claim 18, wherein the generating, by the client device, the set of locally updated HN parameters using the local data and the set of parameters of the HN received from the server comprises:

training the local neural network architecture using the local data to provide a set of updated local neural network architecture weights;

and computing the set of locally updated HN parameters based on differences between the set of updated local neural network architecture weights and the set of local neural network architecture weights output by the local copy of the HN.

20. The method of claim 19, wherein the training the local neural network architecture using the local data to provide the set of updated local neural network architecture weights comprises performing a predefined number of iterations of a local optimization.

21. The method of claim 17, wherein the local copy of the HN comprises a first sub-network and a second sub-network, wherein the first sub-network processes the descriptor of the local neural network architecture in a first stage, and wherein the second sub-network processes output of the first stage to generate the set of local neural network architecture weights in a second stage.

22. The method of claim 21, wherein the first sub-network is a neural network associated with a first subset of parameters among the set of parameters of the HN, and the second sub-network is a set of multilayer perceptrons (MLPs) associated with a second subset of parameters among the set of parameters of the HN.

23. The method of claim 16, wherein the server generates the globally updated set of parameters of the HN based on the set of locally updated HN parameters and one or more additional sets of locally updated HN parameters by performing per-element averaging among the set of locally updated HN parameters and the one or more additional sets of locally updated HN parameters, and the method further comprises:

receiving, by the client device, the globally updated set of parameters of the HN for a next round of communication.

24. A system for training a hyper network (HN), the system comprising:

a server; and a plurality of client devices;

wherein the server is configured to facilitate:

sending a set of parameters of the HN to each of the plurality of client devices;

receiving, from each of one or more respective client devices of the plurality of client devices, a respective set of locally updated HN parameters; and generating, based on the one or more respective sets of locally updated HN parameters, a globally updated set of parameters of the HN, and wherein each respective client device in the at least one of the plurality of client devices is configured to facilitate:

receiving, from the server, the set of parameters of the HN;

generating the respective set of locally updated HN parameters based on a local neural network architecture of the respective client device; and sending, to the server, the respective set of locally updated HN parameters.

25. The system of claim 24, wherein each respective client device is further configured to facilitate determining the respective set of locally updated HN parameters based on the local neural network architecture of the respective client device by:

generating a set of local neural network architecture weights conditioned to the respective local neural network architecture of the respective client device by processing, using the HN, a descriptor representing the local neural network architecture; and training the local neural network architecture using local data to provide a set of updated local neural network architecture weights, computing the respective set of locally updated HN parameters based on differences between the set of updated local neural network architecture weights and the set of local neural network architecture weights conditioned to the respective local neural network.

* * * * *